April 7, 1953     L. G. COPEMAN     2,634,012
BOTTLE CLOSURE
Filed April 25, 1946
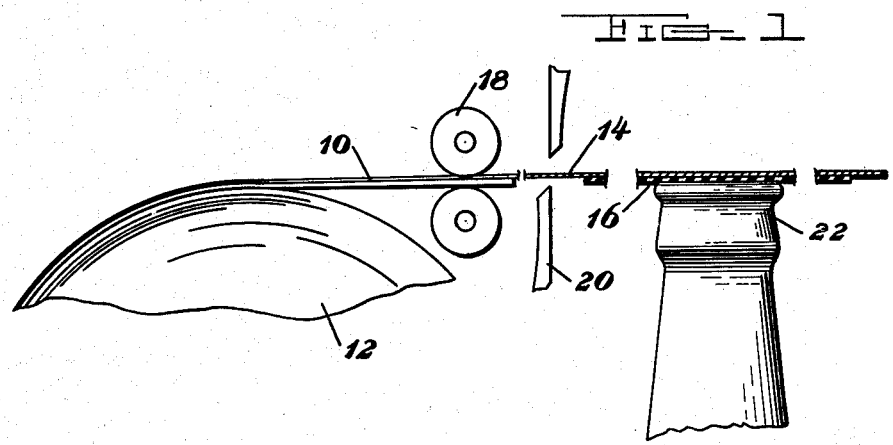
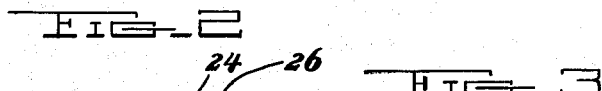
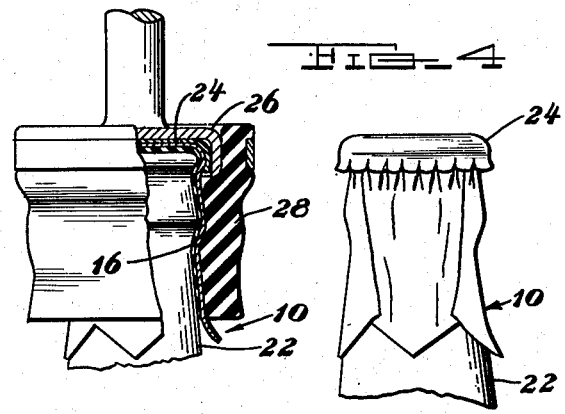
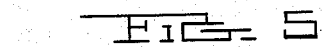
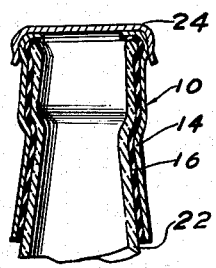
Inventor
LLOYD G. COPEMAN
By Barnes, Kisselle, Laughlin & Raisch
Attorneys Patented Apr. 7, 1953

2,634,012

UNITED STATES PATENT OFFICE 2,634,012

BOTTLE CLOSURE

Lloyd G. Copeman, Metamora, Mich., assignor to Copeman Laboratories Company, Flint, Mich., a corporation of Michigan Application April 25, 1946, Serial No. 664,814

4 Claims. (Cl. 215—38)

This invention relates to laminated sheet material and to articles made therefrom and particularly adapted for use as a packaging or protective material. In the patent to Copeman 2,356,825, there is disclosed a laminated sheet for use as a protective or wrapping material having a cohesive layer on one side.

In the use of such materials for a sanitary covering for the mouth and neck of a bottle, it frequently occurs that the outside of the bottle neck is wet from the bottle filling operation and in order to assure good cohesion of the protective covering some means must be provided for holding the material in close contact with the bottle neck until the moisture has dried out.

It is an object of the present invention to provide an improved laminated sheet material comprising a backing layer of ductile metal foil together with a highly coherent layer which can be used as a protective or wrapping material and applied to articles which are wet with greater facility in forming a sealed enclosure.

A further object is to provide an improved wrapping material provided with a highly cohesive layer formed upon a backing material having the property of retaining any crushed, bent or crumpled shape which it is given without springing back at all.

It is also an object of the present invention to provide an improved protective covering for a capped bottle which may be applied while the bottle is wet and which will hermetically seal the mouth and neck of the bottle against contamination.

A further object is to provide a protective covering of this type which may be used on bottles having a crown cap and which further may be applied to the bottle mouth before the crown cap is applied and without damaging the sanitary covering.

In the drawings:

Fig. 1 is a diagrammatic view illustrating a preferred form of the present invention and showing a first step in applying a protective covering to a bottle neck.

Fig. 2 is a view partly in section illustrating a second step in the application of the covering.

Fig. 3 is a view corresponding to Fig. 2 showing a third step.

Fig. 4 is a fragmentary view of a bottle having the covering of the present invention applied thereto.

Figure 5 is a vertical section showing a modified form of the invention.

In the preferred form of the present invention, a laminated sheet 10 is formed by taking a continuous strip of ductile metal foil, for example, ordinary tin foil, and applying to one face of the foil either a continuous or an interrupted layer of highly cohesive material. Such a layer may be formed by coating with an aqueous dispersion of latex or the like directly to one side of the foil after which it is permitted to partially set-up without permitting a full set-up or cure. Prior to the full cure, the thus laminated strip may be rolled upon itself to exclude air from the deposited latex layer, thus providing a convenient stock roll such as illustrated at 12, from which the protective strip may be dispensed as required.

When the strip is unrolled from itself in use, the deposited latex layer while substantially non-tacky and being only partially cured, is in a state where it is very highly cohesive to itself when two portions of its surface are brought into contact with one another. Due to its substantially non-tacky nature, however, it does not adhere to other surfaces such as glass or to the back face of the foil layer with sufficient adhesion to prevent its ready removal leaving such surface completely clean.

Where the improved protective material is to be used in production bottling operations, it is preferred to form the protective covering from a continuous strip of foil 14 to which is intimately bonded a layer of deposited latex 16 over spaced areas which may be either round or square or of other suitable shapes and sufficient to cover the mouth and neck of the particular bottle to be protected. These latex areas may be applied by any suitable method, as for instance, from rollers dipping in a bath of latex dispersion and having raised portions conforming to the area desired to be covered. After partially curing by drying to the point where the latex layer has become substantially non-tacky, the laminated sheet is rolled upon itself, thus sealing the deposited latex from further curing except at a very slow rate. I have found that a compounded latex sold by American Anode Company of Akron, Ohio, under the name Protex #11.776, is particularly suited as a coating material, and particularly has good cohesive properties when partially set and protected from the air.

A preferred method of applying such a covering sheet to a bottle consists in unwinding it from the roll 12 as shown in Fig. 1 and feeding it by means of pinch rolls 18 through a shearing device 20 to overlie the top of a bottle 22. Suitable guide means not shown may support the protective layer as it is pushed to the right by the feed rolls 18. The shears 20 are then closed to sever the material, leaving a square of sheet 10 centered on the mouth of the bottle 22.

The bottle is then placed under a capping head as illustrated in Fig. 2. Preferably this comprises the usual crown cap 24 and cap crimping sleeve 26 together with a rubber squeegee device 28. The latter comprises a rubber cylinder or sleeve adapted to be forced down over the neck of the bottle and to be stretched in so doing so that the protective sheet 10 is snugly enrobed around the neck of the bottle and pleated, folded or crumpled into close engagement therewith. During the final part of the downward stroke on the capping mechanism, the crown cap engages the bottle top and is crimped in place on top of the protective covering 10 as shown more clearly in Fig. 3. The capping device is then drawn upwardly either simultaneously with the sleeve 28 or the sleeve may be withdrawn first, in which case the crimping sleeve 26 serves to guide the rubber sleeve over the sharp edges of the crown cap without tearing. This leaves a capped bottle having the appearance shown in Fig. 4. Since the foil is backed and reinforced by a layer of deposited latex, or the like, the crimping of the crown cap will normally not rupture the foil, but if the foil should be ruptured at any point, the layer of rubber will still maintain a sanitary seal.

Since the filling operation, which precedes the placing of the protective layer over the bottle mouth, as shown in Fig. 1, frequently involves spilling of the liquid over the outside of the bottle neck, the inclusion of such liquid between adjacent portions of the latex layer 16 would interfere, to some extent, with securing proper cohesion of the latex to itself and would reduce the temporary adherence of the same to the walls of the bottle. The action of the squeegee 28, however, drives substantially all of the liquid down the bottle neck ahead of the protecting covering as it engages the bottle neck and greatly reduces the amount of moisture which remains to interfere with the cohesive properties of the latex layer. However, it might be impossible to exclude all moisture by such a method and a distinct advantage of the present covering lies in the total lack of springy characteristics of the backing layer 14. Thus the soft ductile foil retains any conformation which is given to it by the squeegee 28 and holds the cohesive layer in close contact with itself until it has become fully dried out and united into an integral self-sealing hood.

It will be noted that a bottle thus protected has its mouth and neck maintained in a sanitary condition during subsequent handling and, further, that the crown cap 24 may be removed without removing the protective sheet 10. Thus, for example, in the case of bottles containing soft drinks or beer, they may be served to the customer with the crown cap removed and with the protective covering still in place so that the customer is assured that the mouth and pouring neck of the bottle have been maintained in a sanitary condition up to the time he uses it.

While the invention has been illustrated in connection with the protection of bottles, it will be understood that the improved laminated sheet material may be used for other protective and wrapping purposes, thus, for example, the roll 12 may be formed with a continuous coating of deposited, partially set-up latex which, when unrolled from the roll, may be cut in pieces of suitable size and used to wrap articles of any nature. It is particularly useful for wrapping meats and other foods which are to be frozen, and when so wrapped the edges of the protective covering may be brought into contact and cohered to each other. Due to the non-springy nature of the backing 14, the wrapping may be closely pressed against all the irregular contours of the article being wrapped to exclude air, thus giving a snug-fitting wrapping of high heat conductivity which greatly accelerates and facilitates a subsequent freezing operation.

The terms "latex," "aqueous dispersions of rubber," and "rubber" as used in the specification and claims are intended to cover both natural and synthetic materials or combinations of natural and synthetic materials, as well as compounds or mixtures of natural or synthetic latices with other ingredients which may be added to impart stability, fluidity, viscosity and other desirable features to the coating bath, provided that the resultant film is non-tacky and has the property of self-adhesion.

As shown in Figure 5 the foil-backed latex coating may be wrapped around the top of the bottle, leaving a hole at the top but still be confined beneath the periphery of the crown cap.

I claim:

1. In combination, a conventional crown type bottle cap of stiff material, a bottle having a mouth and neck formed to receive a conventional crown type bottle cap which is held in place by crimping around the outer edge of the bottle, the bottle neck being narrowed externally below the mouth, and a protective covering underlying the bottle cap and overlying the mouth of the bottle with a substantial skirt portion on the neck below all parts of the bottle cap, said covering comprising a backing of ductile metal foil coated on one side with an adherent layer of rubber deposited from an aqueous dispersion of latex which has had the water removed and is in a partially set-up state in which it is substantially non-tacky but still capable of cohering to itself, the skirt portion being pressed close to the bottle neck at and below the narrowed portion to cause the covering to cling to the bottle top by reason of the latex surface and the restricting nature of the foil.

2. In combination, a conventional crown type bottle cap of stiff material, a bottle having a mouth and neck formed to receive a conventional crown type bottle cap which is held in place by crimping around the outer edge of the bottle, the bottle neck being narrowed externally below the mouth, and a protective covering underlying the bottle cap and overlying the mouth of the bottle with a substantial skirt portion on the neck below all parts of the bottle cap, said covering comprising a sheet of metal foil having bonded thereto a layer of rubber in a partially set-up state to be substantially non-tacky but coherent, said foil having sufficient form sustaining characteristics when pressed close to the neck of a bottle that it will maintain its conformed shape to insure contact of the coated surfaces of the laminated sheet with the bottle neck after any excess moisture on the bottle has evaporated to cause the covering to cling to the neck independently of the crown cap.

3. In combination, a conventional crown type bottle cap of stiff material, a bottle having a mouth and neck formed to receive a conventional crown type bottle cap which is held in place by crimping around the outer edge of the bottle, and a protective covering underlying the bottle cap and overlying the mouth of the bottle and a substantial portion of the neck below all parts of the bottle cap, said covering comprising a sheet of backing material coated on the underside with a partially set-up layer of rubber being substantially non-tacky but coherent.

4. In combination, a conventional crown type bottle cap of stiff material, a bottle having a mouth and neck formed to receive a conventional crown type bottle cap which is held in place by crimping around the outer edge of the bottle, and a protective covering underlying the bottle cap and overlying the mouth of the bottle and a substantial portion of the neck below all parts of the bottle cap, said covering comprising a sheet of backing material coated on one side with a film of adhesive material to form a cushion between the covering and the bottle and to cohere at overlapping portions of the covering.

LLOYD G. COPEMAN.

REFERENCES CITED

The following references are of record in the file of this patent:

UNITED STATES PATENTS

| Number | Name | Date |
|---|---|---|
| 1,024,584 | Knaust | Apr. 30, 1912 |
| 1,719,212 | Chausse | July 2, 1929 |
| 2,015,268 | Hammond | Sept. 24, 1935 |
| 2,118,595 | Eisen | May 24, 1938 |
| 2,123,903 | Lane | July 19, 1938 |
| 2,128,196 | Vogel | Aug. 23, 1938 |
| 2,131,438 | Jensen | Sept. 27, 1938 |
| 2,210,509 | Strauch | Aug. 6, 1940 |
| 2,298,480 | Harvey | Oct. 13, 1942 |
| 2,356,825 | Copeman | Aug. 29, 1944 |
| 2,388,738 | Gudheim | Nov. 13, 1945 |
| 2,431,114 | Golding | Nov. 18, 1947 |
| 2,447,690 | Ekstedt et al. | Aug. 24, 1948 |

FOREIGN PATENTS

| Number | Country | Date |
|---|---|---|
| 17,365 | Australia | of 1928 |
| 478,718 | Great Britain | Jan. 24, 1938 |
| 746,008 | France | Feb. 6, 1932 |